Patented Feb. 5, 1924.

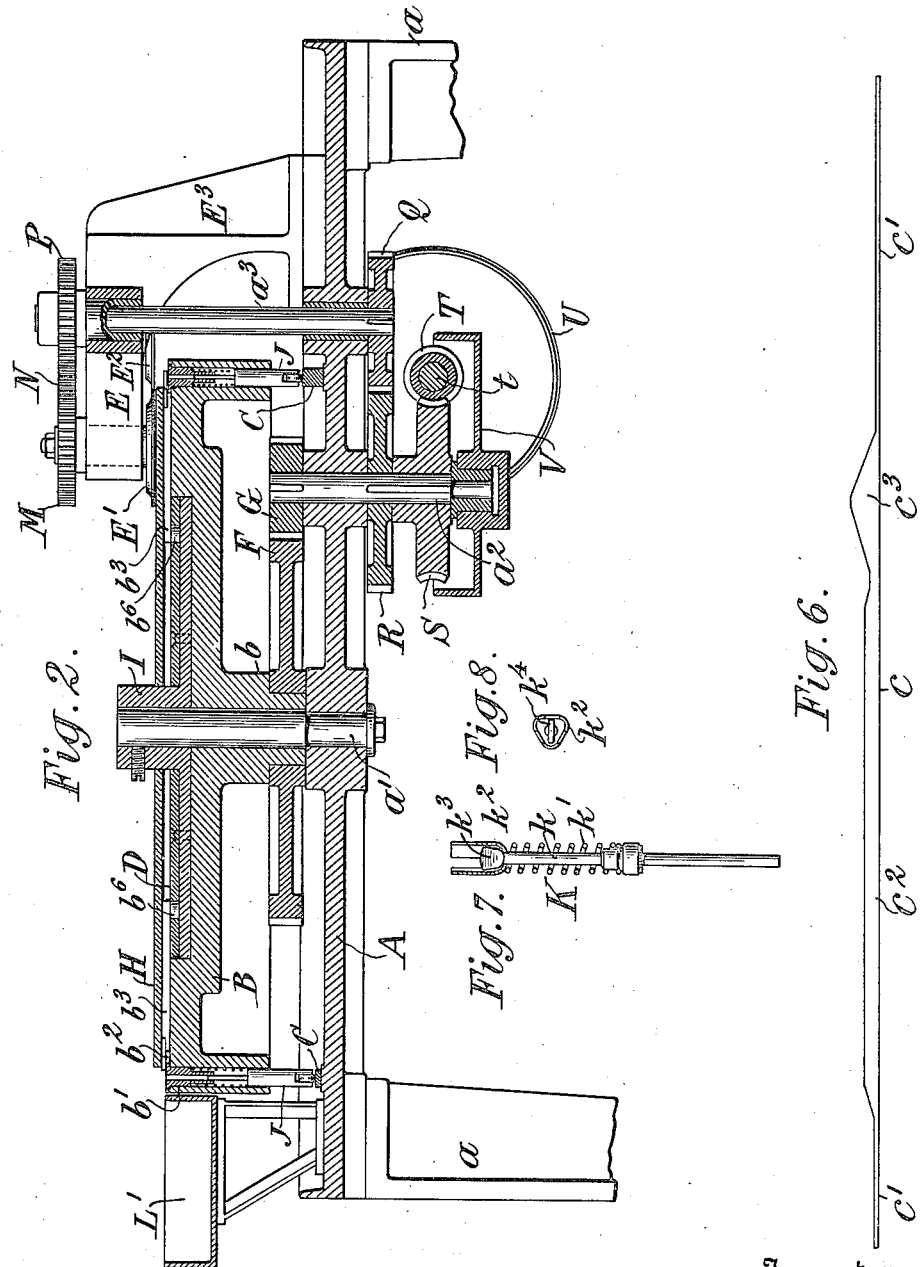

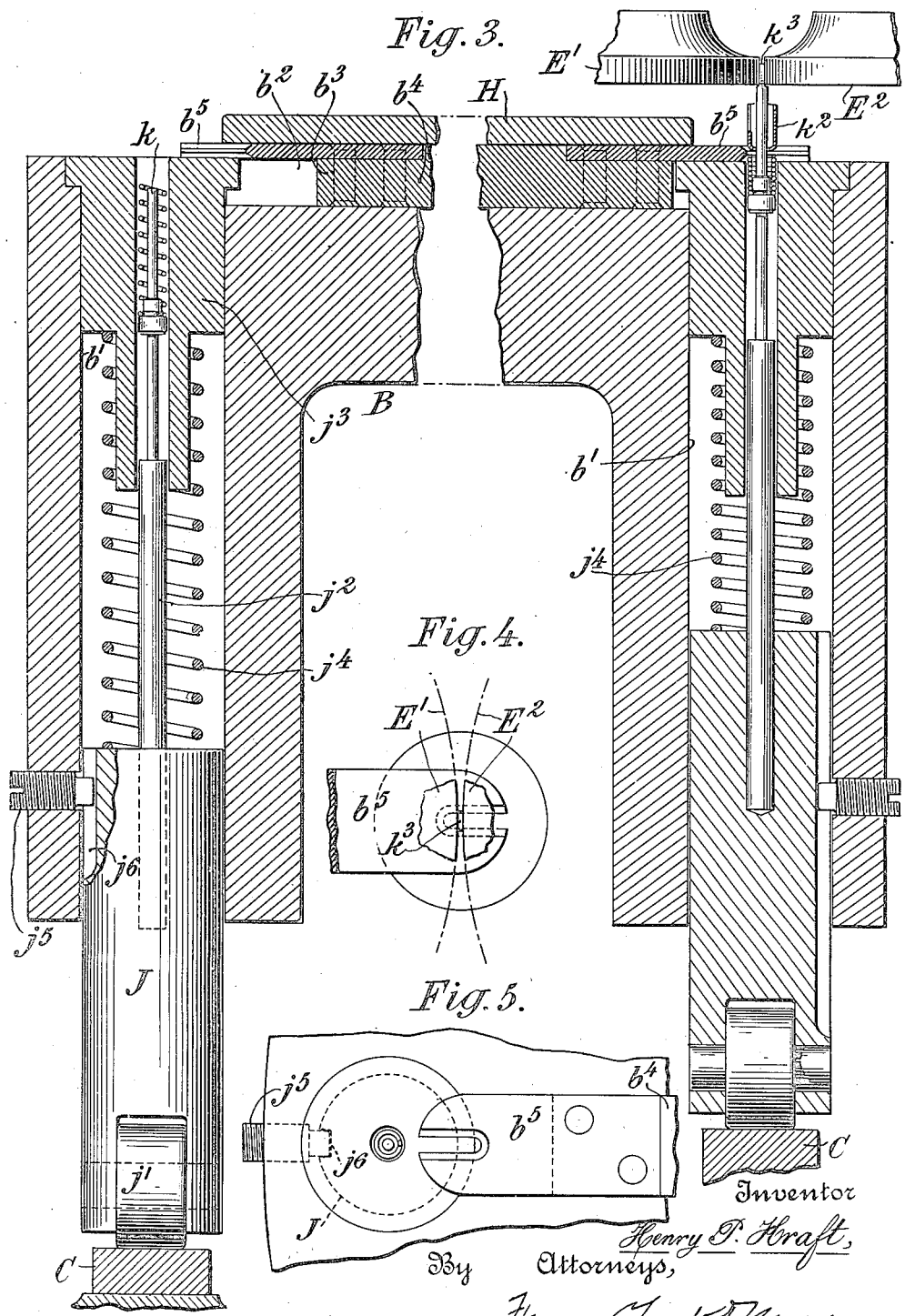

1,482,687

UNITED STATES PATENT OFFICE.

HENRY PHILLIP KRAFT, OF RIDGEWOOD, NEW JERSEY.

MACHINE FOR ASSEMBLING VALVE PARTS.

Application filed July 6, 1921. Serial No. 482,865.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Machines for Assembling Valve Parts, of which the following is a specification.

This invention relates to machines for assembling valve parts, and aims to provide a machine whereby certain of the valve parts constituting the "valve insides" may be rapidly and efficiently assembled.

Tire valves, as now generally constituted, comprise a valve casing and "valve insides" or working parts. These "valve insides" usually consist of a valve pin upon which is fixedly mounted the valve, a screw-threaded plug carrying a valve seat, a valve spring which urges the valve outwardly against the valve seat, in addition to the air pressure in the tire, and a spring seat for supporting the valve spring. The valve pin is preferably swaged or enlarged adjacent each of its ends to retain the various parts in their assembled relationship, and it is with the assembly of the valve pin, valve spring and spring cup that this invention is particularly identified, although the present invention with suitable modifications may be employed in the assembling operations of other devices or parts.

According to the machine contemplated by the present invention, there is provided a rotating dial provided with suitable openings for the reception of the parts to be assembled which parts are to be successively fed to the openings in the dial during its rotation. The parts are appropriately held and positioned in said openings until in the course of their rotation the pin elements are projected upwardly and engaged between a pair of squeezing or swaging rolls which flatten their ends and thus keep the parts in assembled relationship. Suitable means are provided for ejecting the assembled parts from the machine, so that the same operations may be repeated in the succeeding rotating cycle. The invention includes other features which will be hereinafter more fully described.

An understanding of the construction and operation of the preferred embodiment of the invention may be obtained by referring to the accompanying drawings, wherein:

Fig. 2 is a diametrical section of Fig. 1.

Fig. 3 is an enlarged sectional view of certain parts shown in Fig. 2.

Fig. 4 is a plan view of a valve pin engaged between the swaging rolls, taken substantially on the line 4—4 of Fig. 1.

Fig. 5 is a plan view of one of the spring fingers just preparatory to engaging over a dial opening, substantially on the line 5—5 of Fig. 1.

Fig. 6 shows a development of the elevation of the plunger actuating cam.

Fig. 7 shows an elevation of the assembled valve parts, and

Fig. 8 shows a top plan view of said assembled valve parts.

Figure 1:
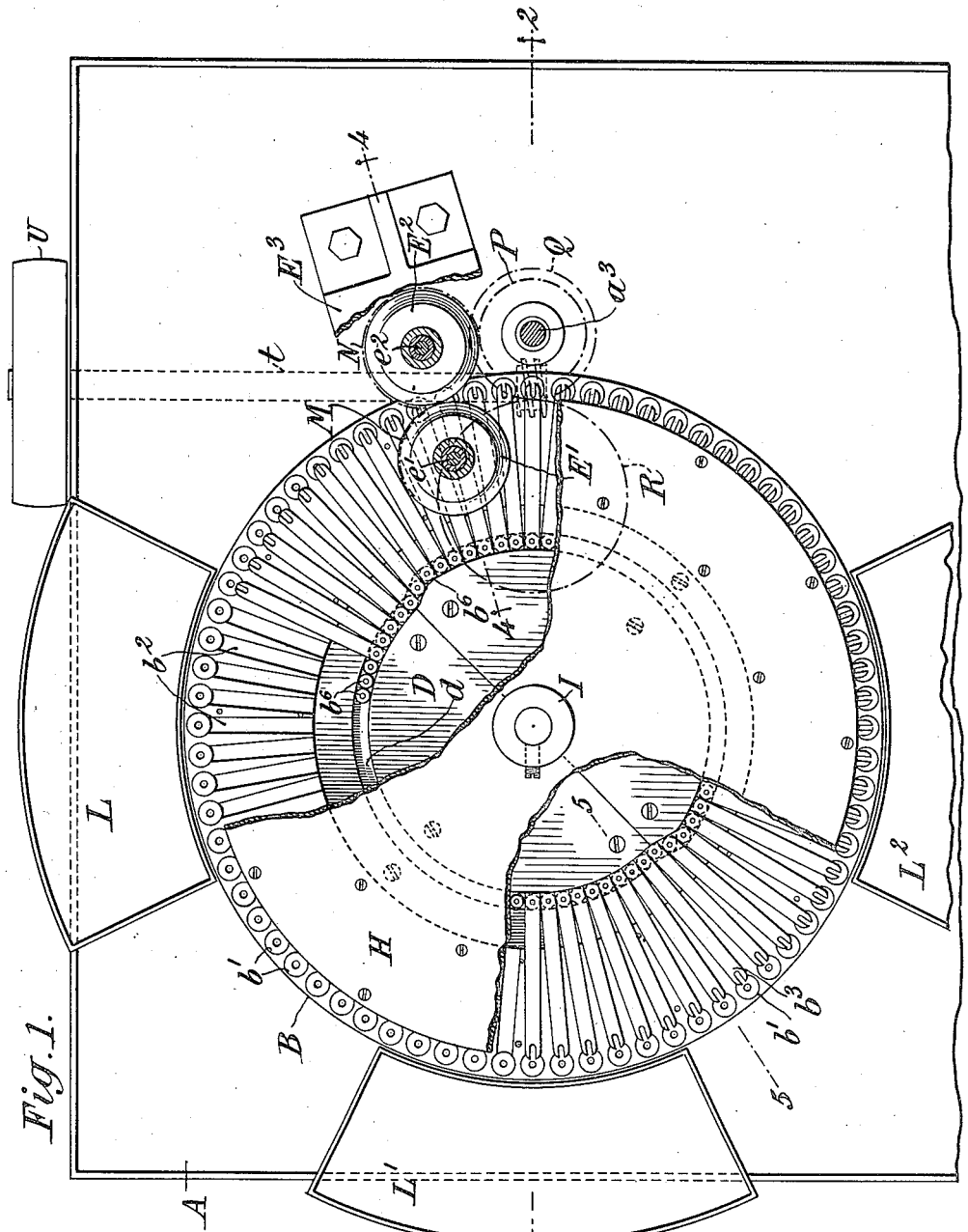
Figure 1 shows a top plan view of the machine, with parts broken away to disclose some of the operating mechanism.

Referring to the drawings, let A represent the base plate or table of the machine upon which is rotatively mounted the feeding dial B, the plunger actuating cam C, the spring-finger operating cam disk D, and the swaging rolls designated by the letter E. These elements constitute the primary elements of the machine and their relationship and operation will become apparent as the detailed description of the invention proceeds.

The base plate or table A as herein disclosed is of rectangular form and provided along its edges with an upturned flange. Said base plate is supported upon suitable legs $a$, $a$. Through the face of said table are suitably mounted vertical spindles $a'$, $a^2$ and $a^3$, carrying the feeding dial, the driving gears and the swaging rolls respectively. The feeding dial B is mounted to freely turn on the spindle $a'$, it being driven by the gear F which is fixedly mounted on a collar $b$ on said feeding dial, said gear F being driven by a pinion G on spindle $a^2$. The feeding dial B is provided adjacent its outer periphery with a continuous series of openings $b'$, herein shown as cylindrical, into which the various parts to be assembled are adapted to be placed, and communicating with each of said openings is a radial groove $b^2$ formed in the surface of the feeding dial, in which are slidably mounted the spring fingers $b^3$. As herein disclosed each of said spring fingers $b^3$ consists of a body member $b^4$ and a longitudinally divided finger portion $b^5$, separately formed and fastened together as shown, but it is to be understood that said spring fingers may be of integral construction if desired. The sliding movement of the spring fingers is provided by rollers $b^6$ carried by the said fingers, adjacent their inner ends, moving in a cam groove on the cam D. These spring fingers are prevented from moving upwardly, out of their guiding grooves, by a cover plate H, which is positioned to bear lightly on said fingers. The cam D as herein disclosed is shown as consisting of four parts so positioned as to constitute a cam groove $d$, in which the rollers $b^6$ are movable, the groove being formed with two offsets, one for projecting the fingers outwardly and the other for retracting them. It is, however, obvious that said cam may be made of one or any number of parts, this being but a matter of design or mechanical skill. To prevent this cam disk from rotating with respect to the feeding dial it is secured to a cam supporting disk I, formed with a cylindrical flange or collar, which is non-rotatively mounted on the spindle $a'$, as shown in Figs. 1 and 2.

In providing suitable means, whereby the valve pins may be moved outwardly during the assembling operation, each of the openings $b'$ in the feeding dial has fitted therein a spring pressed plunger J, carrying at one end a roller $j'$, adapted to move over the cam surface C, and at the other end a reduced extension member $j^2$, movable in the central opening of a hollow plug $j^3$. The plug $j^3$ is provided with a shoulder against which bears a spring $j^4$ which urges the plunger roller against the cam face. Suitable means are provided for guiding the plungers in their respective openings and as herein shown, consist of set screws $j^5$, passing through one wall of the feeding dial and positioned in grooves $j^6$ in the plungers.

In the assembling of the valve parts K consisting of the valve pin $k$, having a valve body fitted thereon, valve spring $k'$ and spring cup $k^2$, shown in assembled relation in Fig. 7, the valve pins, valve springs and spring cups are successively fed to the feeding dial, the first two being fed into the openings in the hollow plugs $j^3$ and the third over said pins but above the spring fingers $b^3$, by operators or other suitable means positioned about the feeding dial, a supply of said valve parts being held in work trays, L, L' and L² respectively. During the feeding of the valve pins and the valve springs into the openings in the hollow plugs, the spring pressed plungers J move over the lowest portion of the cam C, indicated in Fig. 6 by the letter $c'$, and the spring fingers $b^3$ are retained in their retracted position by the cam groove $d$. However, soon after these parts have been fed to the openings, the feeding dial will have reached the point in its rotation corresponding to the line 5—5, Fig. 1, and at this point, the spring fingers are caused to move outwardly and engage over the openings in the plugs $j^3$, and retain the valve spring positioned therein below the top surface of the plug. Simultaneously with this action, the plungers J progressively move over a raised portion of the cam C indicated as $c^2$ in Fig. 6, and project the valve pins in the plugs a fixed distance above the top surface thereof, the valve pins during said movement passing up through the slots in the spring finger portions $b^5$. It is after these pins are projected upwardly, that the spring cups are mounted over them. The exposed ends of the valve pins, being of greater height than the spring cups positioned thereon, leaves the extreme ends of the pins free to be engaged between the swaging rolls, to be swaged. The swaged end of the valve pin is indicated at $k^4$ in Figs. 7 and 8. After passing through the swaging rolls, the spring fingers are retracted, and the plungers then caused to pass over a third rise in the cam C indicated by the letter $c^3$ in Fig. 6, which ejects the assembled parts from the feeding dial. The spring pressed plungers are then again moved into contact with the first height $c'$ of the cam C and the machine is ready for repeating the same cycle of operations.

The swaging rolls E as shown consist of a pair rollers E' and E² mounted upon suitable spindles $e'$ and $e^2$, to rotate in opposite directions, at a fixed distance above the surface of the feeding dial. The spindles $e'$ and $e^2$ are supported in suitable bearings carried by a bracket member E³ mounted upon the base plate A. For rotating the rolls E' and E² suitable meshing spur gears M, N and P are employed, said gears being properly keyed or otherwise fastened to the spindles $e'$, $e^2$ and $a^3$ respectively. The spindle $a^3$ which carries the spur gear P is rotated by means of the meshing gears Q and R, the former being carried by the spindle $a^3$ and the latter by the spindle $a^2$. As herein disclosed, the spindle $a^2$, carries a worm wheel S which is driven by a worm T mounted on a shaft $t$, which is associated with the driving pulley U. Any suitable form of clutch mechanism may be employed in conjunction with the shaft $t$, and the pulley U, for starting and stopping the machine, but this, not constituting a part of the present invention is not illustrated. In Fig. 2, an oil box V is shown for catching and holding the oil and grease drippings from the various bearing and meshing gears.

From the foregoing detailed description, it is believed that the construction and operation of the machine will be readily comprehended.

While I have herein shown and described but a single embodiment of the invention, it will be understood that I do not wish to be limited thereto, since various changes may be made therein, without departing from the spirit of the invention.

What I claim is:—

1. An assembling machine for tire valve inside parts comprising a valve pin and valve spring, having in combination, means adapted to receive the valve parts to be assembled, means for positioning said parts so that the valve pins project beyond the valve springs and means for acting on the projecting portion of the valve pins to hold the parts in permanently assembled relation.

2. An assembling machine for tire valve inside parts each of which comprises a valve pin and a valve spring, having in combination, means adapted to receive the valve parts, means for positioning said parts so that the valve pins project beyond the valve springs, and means for acting upon the projecting ends of the pins to hold the parts in permanently assembled relation, the first and last named means being movable relatively to each other.

3. A machine for assembling valve parts, comprising a rotatable feeding dial provided with a series of openings each adapted to receive the parts to be assembled in the following sequence, the valve pin, the valve spring and the spring cup, means for retaining said parts in said openings, means for projecting the valve pins above the face of the dial after passing a fixed point, means for swaging the exposed ends of the valve pins, and means for ejecting the assembled parts from the feeding dial.

4. A machine for assembling valve parts, comprising a rotatable feeding dial provided with a series of openings each adapted to receive the parts to be assembled in the following sequence, the valve pin, the valve spring and the spring cup, spring fingers for retaining said parts in said openings, means for projecting the valve pins above the face of the dial after passing a fixed point, means for swaging the exposed ends of the valve pins, and means for ejecting the assembled parts from the feeding dial.

5. A machine for assembling valve parts, comprising a rotatable feeding dial provided with a series of openings each adapted to receive the parts to be assembled in the following sequence, the valve pin, the valve spring and the spring cup, spring fingers for retaining said parts in said openings, a cam for projecting the valve pins above the face of the dial after passing a fixed point, means for swaging the exposed ends of the valve pins, and means for ejecting the assembled parts from the feeding dial.

6. A machine for assembling valve parts, comprising a rotatable feeding dial provided with a series of openings each adapted to receive the parts to be assembled in the following sequence, the valve pin, the valve spring and the spring cup, spring fingers for retaining said parts in said openings, a cam for projecting the valve pins above the face of the dial after passing a fixed point, a pair of rolls for swaging the exposed ends of the valve pins, and means for ejecting the assembled parts from the feeding dial.

7. A machine for assembling valve parts, comprising a rotatable feeding dial provided with a series of openings each adapted to receive the parts to be assembled in the following sequence, the valve pin, the valve spring and the spring cup, spring fingers for retaining said parts in said openings, a cam for projecting the valve pins above the face of the dial after passing a fixed point, a pair of rolls for swaging the exposed ends of the valve pins, and a high rise in the aforementioned cam for ejecting the assembled parts from the feeding dial.

8. A machine for assembling valve parts or the like, comprising a rotatably mounted feeding dial provided with openings adapted to receive the parts to be assembled, a plunger in each of said openings and means for operatively positioning the plungers at predetermined depths during the rotation of the dial.

9. A machine for assembling valve parts or the like, comprising a rotatably mounted feeding dial provided with openings adapted to receive the parts to be assembled, a spring pressed plunger in each of said openings and means for operatively positioning the plungers at predetermined depths during the rotation of the dial.

10. A machine for assembling valve parts or the like, comprising a base plate, a feeding dial rotatably mounted on the base plate and provided with openings adapted to receive the parts to be assembled, a plunger in each of said openings and means for operatively positioning the plungers at predetermined depths during the rotation of the dial, said means comprising a cam mounted on the base plate.

11. A machine for assembling valve parts or the like, comprising a base plate, a feeding dial rotatably mounted on the base plate and provided with openings adapted to receive the parts to be assembled, a plunger in each of said openings and means for operatively positioning the plungers at predetermined depths during the rotation of the dial, said means comprising a cam mounted on the base plate, and each of said plungers carrying a roller adapted to move over said cam surface, 12. A machine for assembling valve parts or the like, comprising a base plate, a feeding dial rotatably mounted on the base plate and provided with openings adapted to receive the parts to be assembled, a plunger in each of said openings and means for operatively positioning the plungers at predetermined depths during the rotation of the dial, said means comprising a circular cam mounted on the base plate.

13. A machine for assembling valve parts or the like, comprising a base plate, a feeding dial rotatably mounted on the base plate and provided with openings adapted to receive the parts to be assembled, a plunger in each of said openings and means for operatively positioning the plungers at predetermined depths during the rotation of the dial, said means comprising a circular cam mounted on the base plate, and having three distinct rises, the first corresponding to an arc within which the valve pin and valve springs are fed to the feeding dial, the second to the distance that the valve pins are raised preparatory to the swaging operation, and the third corresponding to the ejecting position of the assembled parts.

14. A machine for assembling valve parts or the like, comprising a rotatably mounted feeding dial provided with a series of openings and communicating grooves, spring fingers slidable in said grooves and operative for holding the valve springs below the surface of the feeding dial after they have been fed therein.

15. A machine for assembling valve parts or the like, comprising a rotatably mounted feeding dial provided with a series of openings and communicating grooves, spring fingers slidable in said grooves and operative for holding the valve springs below the surface of the feeding dial after they have been fed therein, said springs fingers being operable by a cam.

16. A machine for assembling valve parts or the like, comprising a rotatably mounted feeding dial provided with a series of openings and communicating grooves, spring fingers slidable in said grooves and operative for holding the valve springs below the surface of the feeding dial after they have been fed therein, said spring fingers being provided with rollers which move over a fixed cam surface.

17. A machine for assembling valve parts or the like, comprising a rotatably mounted feeding dial provided with a series of openings and communicating grooves, spring fingers slidable in said grooves and operative for holding the valve springs below the surface of the feeding dial after they have been fed therein, but permitting the valve pin to project beyond the surface of the feeding dial.

18. A machine for assembling valve parts or the like, comprising a base plate and a feeding dial rotatably mounted thereon and provided with a series of openings and communicating grooves, spring fingers slidable in said grooves and operative for holding the valve springs below the surface of the feeding dial after they have been fed therein, said spring fingers being operable by a cam carried by the base plate, and retractable by said cam soon after the assembling operation is completed and prior to the ejecting of the assembled parts from the feeding dial.

19. A machine for assembling valve parts or the like, comprising a feeding dial having a series of openings therein, adapted to receive the parts to be assembled, and a pair of swaging rolls mounted above the surface of said dial for swaging the ends of valve pins mounted in openings in the feeding dial.

20. A machine for assembling valve parts or the like, comprising a feeding dial having a series of openings therein, adapted to receive the parts to be assembled, and a pair of swaging rolls mounted above the surface of said dial for swaging the ends of valve pins mounted in openings in the feeding dial, said swaging rolls being so positioned that their contact edges lie in a cylindrical surface which passes through the centers of all the holes in the feeding dial.

21. The art of assembling valve parts which consists in the successive feeding of the valve pin, the valve spring and the spring cap in a suitable assembled disc by successive operators, during the rotation of the assembly disc, causing the pins to project a fixed distance above the assembly disc, swaging the ends of the valve pins as they pass a given point, and finally ejecting the assembled valve parts from the rotating assembly disc.

In witness whereof, I have hereunto signed my name.

HENRY PHILLIP KRAFT.